(12) United States Patent
Marino (10) Patent No.: US 7,319,398 B2
(45) Date of Patent: Jan. 15, 2008

(54) RECONFIGURABLE AND REPLACEABLE RFID ANTENNA NETWORK

(75) Inventor: Ronald A. Marino, Jackson, NJ (US)

(73) Assignee: InnerSpace Corporation, Grand Rapids, MI (US)

( * ) Notice: Subject to any disclaimer, the term of this patent is extended or adjusted under 35 U.S.C. 154(b) by 392 days.

(21) Appl. No.: 11/014,190

(22) Filed: Dec. 15, 2004

(65) Prior Publication Data

US 2006/0125638 A1 Jun. 15, 2006

(51) Int. Cl.
*G08B 13/14* (2006.01)
(52) U.S. Cl. ............................. 340/572.7; 340/572.1; 340/572.4; 340/568.1; 340/10.1; 340/10.2
(58) Field of Classification Search ............. 340/572.7, 340/572.1, 572.4, 568.1, 10.1, 10.2
See application file for complete search history.

(56) References Cited

U.S. PATENT DOCUMENTS

| 5,914,692 | A | 6/1999 | Bowers et al. |
| 6,069,564 | A | 5/2000 | Hatano et al. |
| 6,392,544 | B1 * | 5/2002 | Collins et al. ........... 340/572.7 |
| 6,407,665 | B2 | 6/2002 | Maloney |
| 6,445,297 | B1 | 9/2002 | Nicholson |
| 6,861,993 | B2 | 3/2005 | Waldner |
| 6,903,656 | B1 | 6/2005 | Lee |
| 6,943,688 | B2 | 9/2005 | Chung et al. |
| 6,956,538 | B2 | 10/2005 | Moore |
| 2002/0057208 | A1 | 5/2002 | Lin et al. |
| 2003/0141962 | A1 | 7/2003 | Barink |
| 2003/0174099 | A1 | 9/2003 | Bauer et al. |
| 2004/0212542 | A1 | 10/2004 | Rahim |
| 2005/0024211 | A1 | 2/2005 | Maloney |
| 2005/0040934 | A1 | 2/2005 | Shanton |
| 2005/0043854 | A1 | 2/2005 | Dunlap, Jr. |
| 2005/0093677 | A1 | 5/2005 | Forster et al. |
| 2005/0156739 | A1 | 7/2005 | Maloney |
| 2005/0168345 | A1 | 8/2005 | Swafford, Jr. et al. |
| 2005/0171854 | A1 | 8/2005 | Lyon |
| 2005/0190072 | A1 | 9/2005 | Brown et al. |
| 2005/0212707 | A1 | 9/2005 | Egbert et al. |

FOREIGN PATENT DOCUMENTS

WO WO 2004/102735 A2 11/2004
WO WO 2004/114241 A2 12/2004

OTHER PUBLICATIONS

"The RF in RFID", source(s): http://www.ramengineering.org/Services.htm.
"RFID Shelf Antennas", source(s): http://rfidusa.com/superstore/pdf/RFID_Shelf_Antennas.pdf.
"RFID Reader/Writer and Antenna for Smart Shelf", source(s): http://www.panasonic.com/industrial/other_components_input_devices_rfid_smartshelf.htm.
"An RFID system Installed in Cabinet", source(s): http://www.flomerics.com/microstripes/applications/rfid_cabinet/.

* cited by examiner

*Primary Examiner*—Tai Nguyen
(74) *Attorney, Agent, or Firm*—Warner Norcross & Judd LLP (57) ABSTRACT

An RFID reader system for tracking and locating RFID tags is described, along with an antenna suitable for use in this system, and an antenna configuration apparatus for use in this system. The system offers an antenna configuration that is cost-effective and easily reconfigurable, in which antennas with integral tuning components can be moved or replaced with antennas of a similar or different format. An end user is therefore able to easily reconfigure his or her platform in the field, in order to account for different products or different product orientations. Specific orientations of the reader antennae will furthermore increase system functionality by permitting multiple tag locations on the product.

12 Claims, 7 Drawing Sheets

RECONFIGURABLE AND REPLACEABLE RFID ANTENNA NETWORK

FIELD OF THE INVENTION

The present invention relates to Radio Frequency Identification (RFID) technology, and more particularly to RFID technology used in conjunction with shelves in stores and other environments.

BACKGROUND OF THE INVENTION

RFID technology has become well-known over the past few decades, and its wireless potentialities continue to be expanded and exploited. Implementing an RFID device has certain basic features. The simplest RFID device is the TAG. The tag is typically a completely passive device in that it contains no internal power source; a passive tag derives its operating power from the RF field used to interrogate the tag. A passive RFID Tag 100 is shown as a block diagram in FIG. 1. However, it should be noted that tags can be active also.

Figure 1:
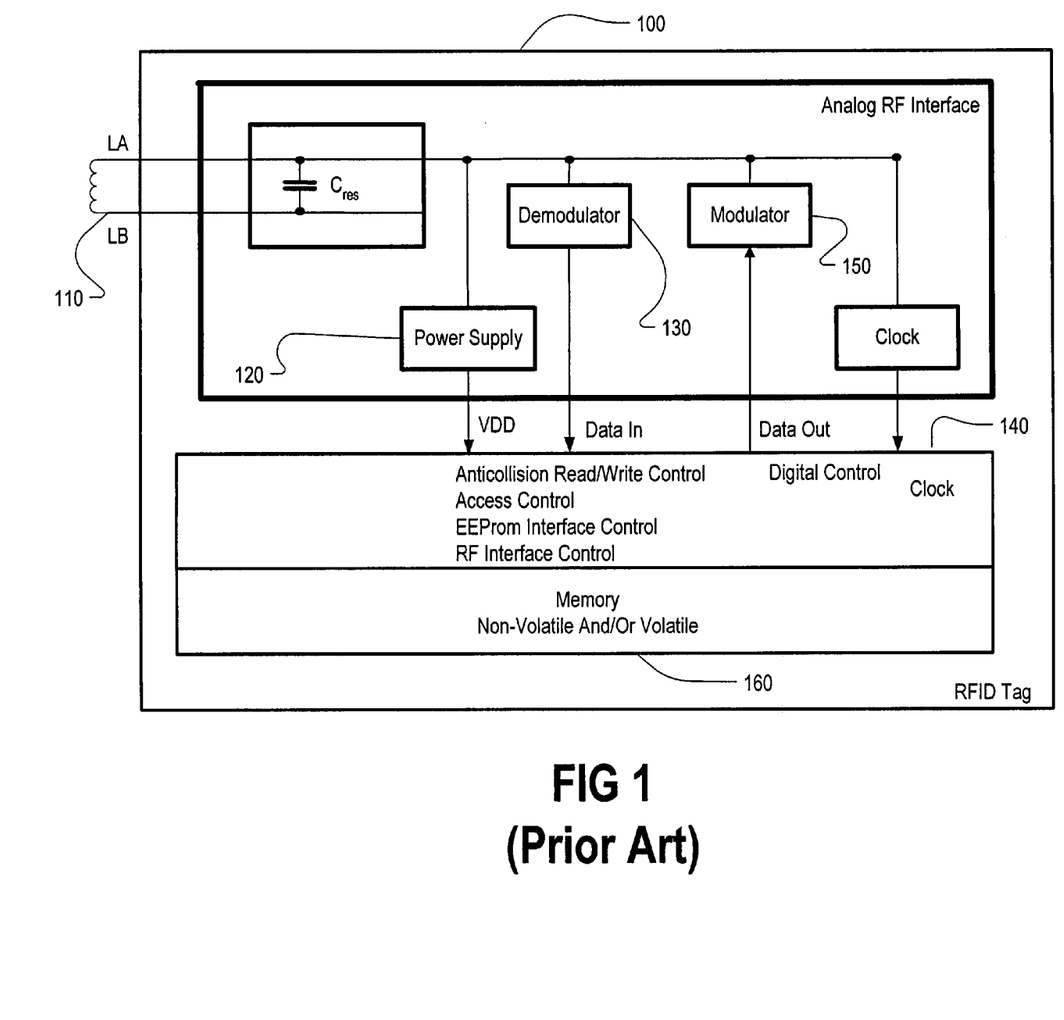
FIG. 1 shows a prior art RFID tag.

The tag's only link to the outside world is normally the antenna 110, shown in FIG. 1 with connections LA and LB. When the antenna picks up an RF field of the proper amplitude and frequency, an operating voltage is generated that can power 120 the tag. The demodulator 130 extracts commands and data from the RF field and passes them along. The digital control block 140 interprets the received commands and data and formats responses. Tag responses are encoded and transmitted by the modulator 150. The memory block 160 stores received data and supplies data for responses. Since the operating voltage comes from the RF field, the contents of a volatile memory are lost when the field is not present. Non-volatile memory contents are maintained even in the absence of an RF field.

This tag architecture is described herein as a passive RFID device, wherein the entire data module is completely passive. As mentioned, the tag's only link to the outside world is normally the antenna, which is true for commercially available tags.

Figure 2:
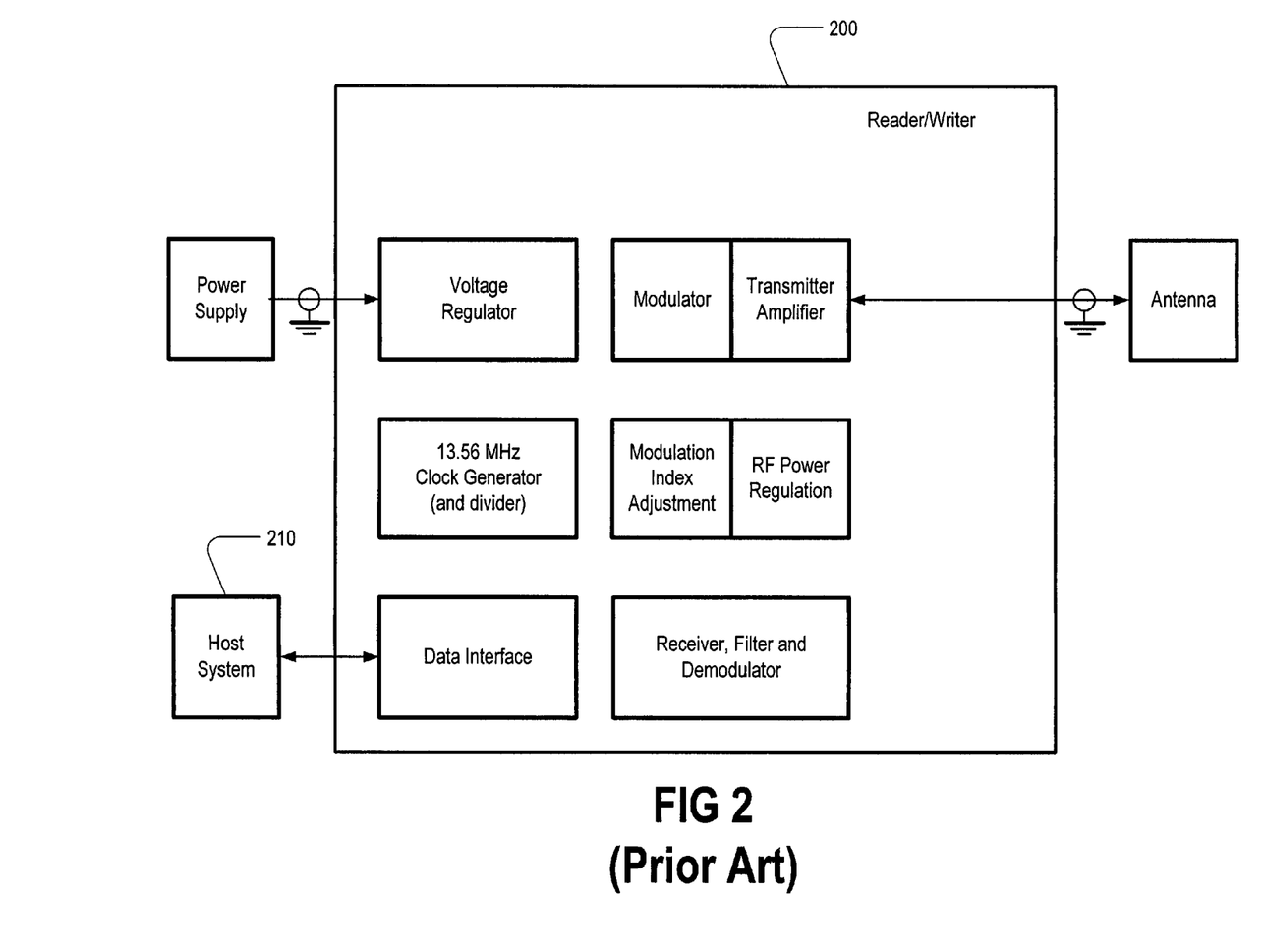
FIG. 2 shows a prior art reader/writer.

An active device is used in order to read from or write to a passive tag. This active device is commonly known as a reader/writer. The reader/writer generates the RF field that powers the tag. The reader/writer formats and transmits commands to the tag and receives responses back from the tag. FIG. 2 shows the block diagram of a reader/writer 200.

A higher-level device such as a computer or embedded micro-controller (the host system 210) controls operation of the reader/writer, which utilizes an RF board. In effect, the reader/writer is a kind of modem or transceiver that interfaces between the host system 210 and the RFID tag. Typically the reader/writer does no processing of the data passing between the RFID tag and the host system; it merely passes data between the two. With these two devices (i.e. the tag and reader/writer), systems can be built. The simplest Radio frequency identification (RFID) systems typically use one or more reader antennae of a reader/writer to send radio frequency (RF) signals to items tagged with RFID tags. The use of such RFID tags to identify an item is well known in the art. In response to the RF signals from the reader (which may also have writer capability), the RFID tags, when excited, produce a disturbance in the magnetic field (or electric field) that is detected by the reader antenna. Throughout this application, the term "reader" may also include a writer, and conversely, the term "reader/writer" may only include a reader. As mentioned, RFID tags are passive tags that are excited or resonate in response to the RF signal from the reader antenna when the tags are within the detection range of the reader antenna.

A system using multiple antennae powered by a single reader unit and using a multiplexer switch to alternate between the antennae is also known in the art. Such a system 300 is conceptually represented in FIG. 3, where separate antennae 301 to 305 are connected to a reader 309 and multiplexer unit 310 through respective transmission cables, via solder points 311 to 317 and 321 to 325. The use of multiple antennae typically improves the spatial coverage when reading tags, without requiring more than one reader unit.

Figure 4:
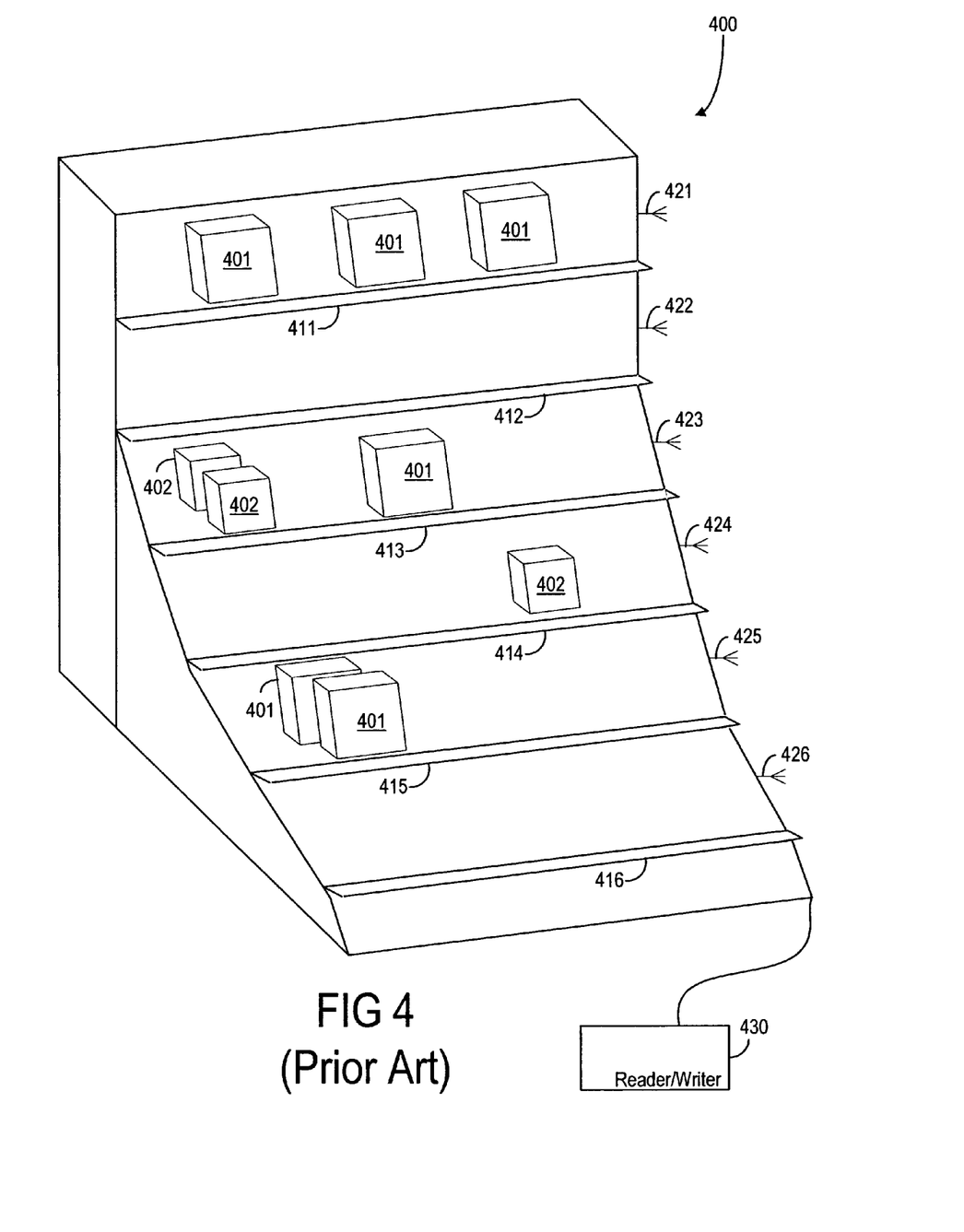
FIG. 4 illustrates prior art shelves equipped with fixed RFID antennae.

As shown in FIG. 4, such a system 400 is often used to identify and locate tagged items 401 and 402 on a shelf or on multiple shelves 411 to 416 in a cabinet. FIG. 4 shows fixed antennas 421 to 426 located at various locations in the shelving system, and these antennas may have separate RFID readers, but preferably the antennas can be linked to a shared RFID reader 430 as shown in FIG. 4. Of course, the antennas 421 to 426 are shown to explain the concept, and are not precise examples of a real system.

Figure 3:
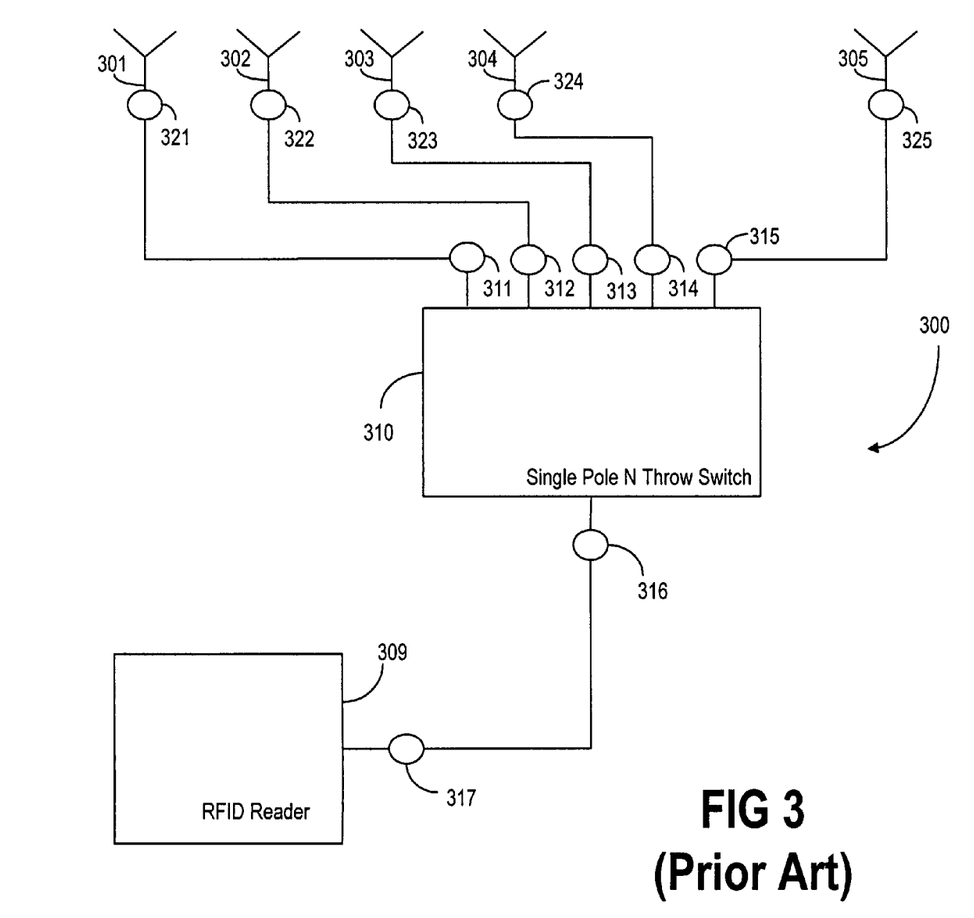
FIG. 3 is a block diagram of prior art fixed antennae connected to a reader and multiplexer unit through respective transmission lines.

The main disadvantage of the arrangement disclosed in FIG. 3 and FIG. 4 is that the reader antennae are fixed in place and are not easily replaceable or reconfigurable. The user cannot modify the RFID antennae configuration to account for changing product sizes and/or product tag location. This type of functionality forces the production of multiple design configurations that is both expensive and time-consuming, and may not even be useful to the end user.

Another shortcoming of the prior art design is in the difficulty of replacing a damaged antenna. A skilled technician would be responsible for disassembly and replacement of the unit, which will be time-consuming and costly.

SUMMARY OF THE INVENTION

A system that incorporates replaceable antennae makes it possible for the user to reconfigure a shelf to a multitude of configurations and thereby add greater functionality to the reader (which may be a reader/writer). At the same time, damaged antennae can be easily replaced without assistance from a specially skilled technician. All of this is achieved through various embodiments of the present inventive concept.

Since an antenna of the present invention is easily removed, it can easily be replaced with an identical or different format antenna. Combining this concept with a standard, inexpensive rail interface allows for the antenna to be placed in numerous locations. The concept need not be combined with a rail interface, and can instead be combined with magnets, dual lock, velcro, and other means for fixing the antenna in place, and thus provide for easy removal.

A single design results in an inexpensive solution due to the economy of scale concept. Also, since the end user has the capability to modify the shelf to his or her own requirements, this solution is more attractive than the prior art, because it offers greater functionality.

According to this invention, an RFID antenna is part of an overall signaling unit that is used by an RFID reader or writer to communicate with RFID tags. The signaling unit may include a printed circuit board (PCB), an antenna printed on the PCB, and an attaching device for removably attaching the signaling unit to a piece that is communicatively connected to the RFID reader or writer. However, note that, instead of a PCB, a ridged wire structure can be used, or a hybrid wire/PCB structure Preferably, each of the signaling units can be connected to the RFID reader or writer using an antenna configuration apparatus. This antenna configuration apparatus includes a plurality of pieces that are communicatively connected to the RFID reader or writer, and also includes a base for supporting the plurality of pieces. The plurality of pieces are dimensioned so as to attach to the signaling units. Two or more of those pieces are designed so that they each can be removably attached to a particular signaling unit that will have different orientations depending upon which of the two or more pieces is used for the attachment. In other words, the signaling units will have different orientations with respect to each other, and so the present invention enables a user to easily arrange the signaling units to form a wide variety of geometries.

The present invention also discloses a system for tracking and locating RFID tags, including the reader unit, a switch matrix including single pole multiple throw switches, a plurality of reconfigurable and replaceable antennae, and a controller for communicating with the reader and for controlling a state of the switch matrix. The key feature in this system is the reconfigurable and replaceable character of the antennas.

These and other objects, features and advantages of the present invention will become more apparent in light of the following detailed description of a best mode embodiment thereof, as illustrated in the accompanying drawings.

DETAILED DESCRIPTION OF THE INVENTION

The present invention provides a system that tracks and locates RFID tags. The preferred embodiment of the system includes a reader unit, a switch matrix comprising single pole multiple throw switches, reconfigurable and easily replaceable antennae, and a controller (computer) that communicates with the reader and controls the state of the switch matrix.

This preferred embodiment of the system also includes a shelf or multiple shelves such as those used in a cabinet, bookshelf, or electronic media shelving. The shelf contains products with RFID tags attached, and the RFID tags will be identified and located by the proposed system. The operating frequency of the preferred embodiment is 13.56 MHz, but the concept may also be applied to other frequency bands, such as UHF. Such a system may be used, for example, in medical cabinets to track such items as stents and pharmaceuticals. Other applications may include the tracking of library books, DVDs and other electronic media.

In addition to tracking, it is also possible for the reader unit to have writer capability, so that at least some information stored in a product's RFID tag can be modified. For example, prices of items can be modified in this way.

Figure 5:
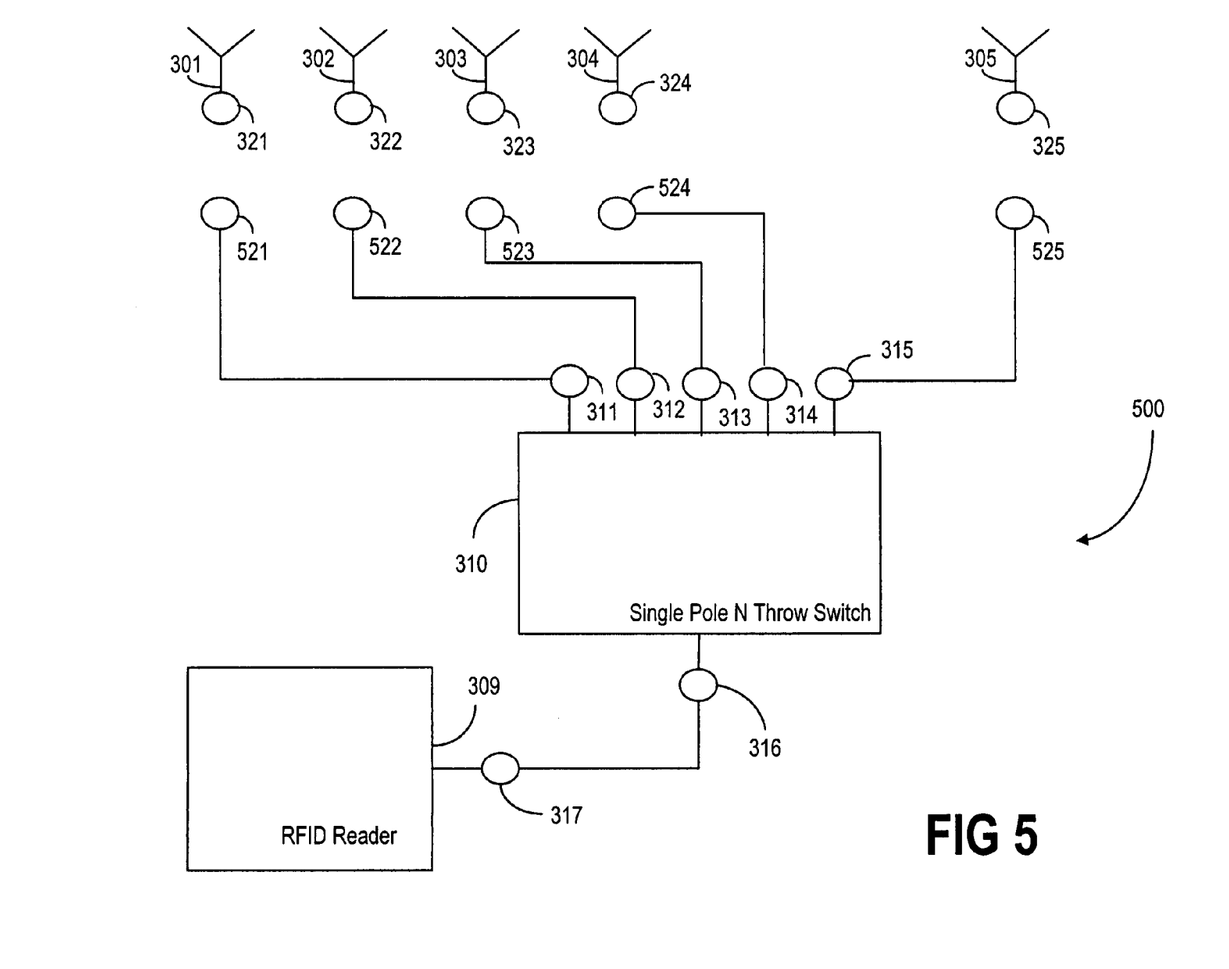
FIG. 5 is a block diagram of the present invention showing replaceable antennae, in contrast with FIG. 3.

As seen in FIG. 5, the present invention incorporates replaceable RFID antennae of various formats to increase system functionality. In FIG. 5, the link between each antenna and the rest of the RFID equipment is easily removed (i.e. the link between solder points 321 and 521, 322 and 522, 323 and 523, 324 and 524, 325 and 525), in contrast to the link shown in FIG. 3.

Figure 6A:
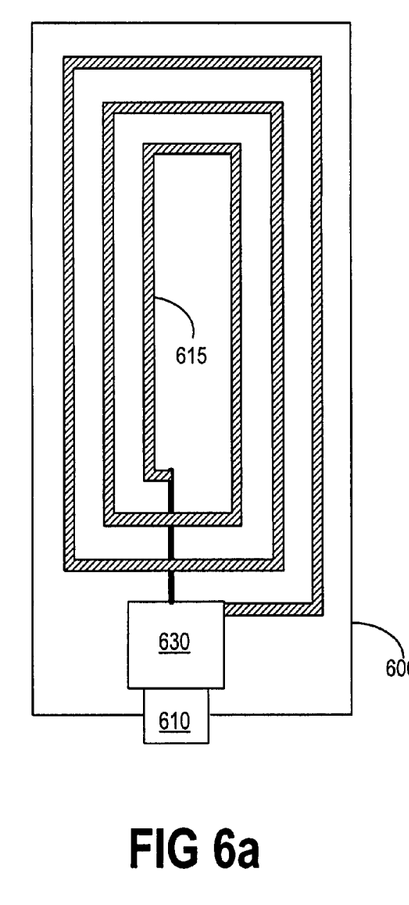
FIG. 6 illustrate the printed circuit board antenna design detail, according to the present invention.
Figure 6B:
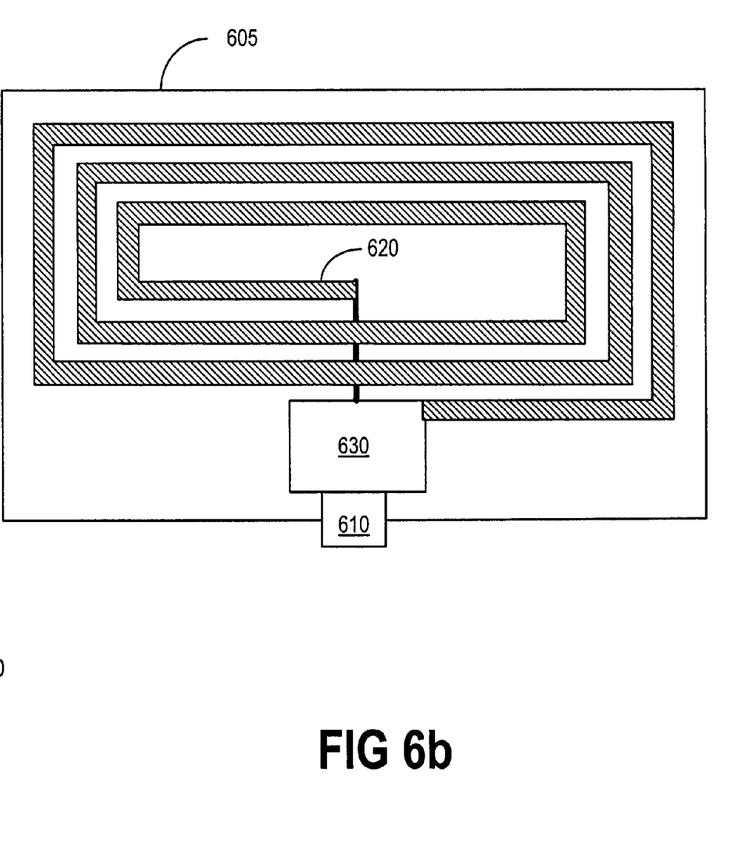

FIGS. 6a and 6b show an RFID signaling unit according to an embodiment of the present invention. FIG. 6a depicts a vertical signaling unit 600 whereas FIG. 6b depicts a horizontal signaling unit 605. In both of these FIGs, the signaling unit includes a printed circuit board 601, to which a common quick disconnect mechanism 610 is attached. Printed on the PCB in FIG. 6a is a vertically oriented PCB antenna 615, whereas FIG. 6b shows a horizontally oriented PCB antenna 620. Both FIG. 6a as well as FIG. 6b also show capacitors 630. Although these antenna configurations shown in FIGS. 6a and 6b show the use of different formats, any shape or type antenna may be used to optimize performance; for example, if UHF functionality is desired, the antenna may be a slot type.

Figure 7:
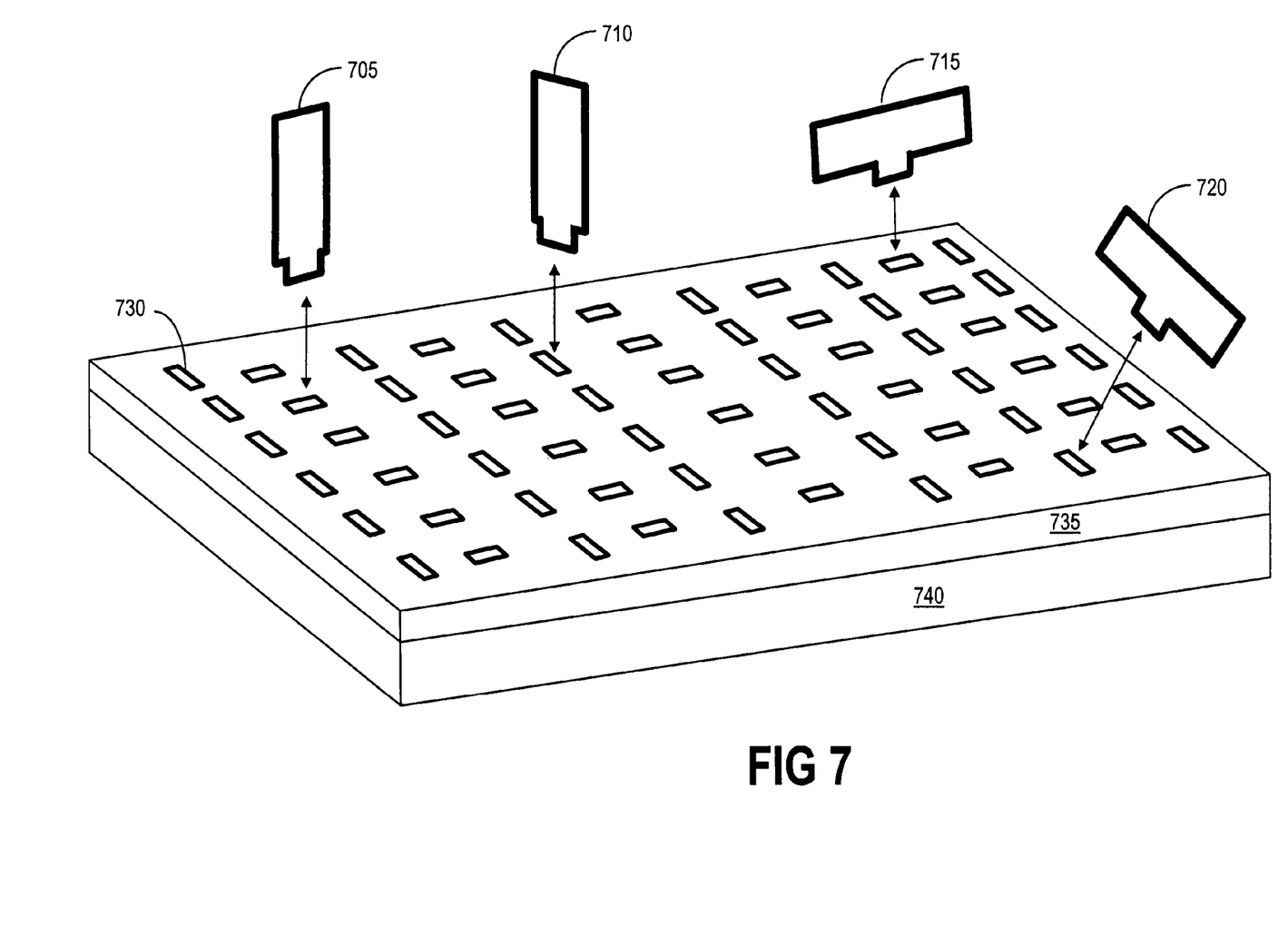
FIG. 7 illustrates antenna removal/replacement detail, according to the present invention.

FIG. 7 illustrates that each signaling unit 705, 710, 715, and 720 (including the respective PCB antennas) may easily be removed and reattached using a variety of slots 730 in the cover 735 of a tray 740. Each slot may, for example, overlie a Deutsche Industrie Norm (DIN) rail located in the tray. A standard off-the-shelf mounting clip with a threaded hole provides one mechanism for allowing the antenna to be connected to the rail, via the slots 730. Using that technique, the antenna is fastened to the clip by soldering the antenna PCB to a brass "L" support bracket, and then the bracket is fastened to the clip with a screw. The rail may also provide for a ground path required for the RF. It is also possible that an antenna can be located inside the tray 740, beneath the cover 735, and this antenna may be a fixed antenna that is used in conjunction with the easily removable signaling units 705, 710, 715, and 720, or the antenna beneath the cover can be removable (e.g. during production).

Upon being inserted into one of the slots 730, the signaling units 705, 710, 715, and 720 can be connected to a card edge connector. The antenna slides into the card edge connect, which is fitted with a short flexible cable that completes the RF path to the reader.

The connections (terminals, receptacles, connectors, etc.) used in the RF path may be any that offer a quick disconnect functionality (such as a plug and jack), which is preferably activated by simply pushing or pulling on the signaling unit. The DIN rail itself may also be configured to accept quick-release terminals such that the rail performs as a transmission line, and the flexible cable is then not required.

In this embodiment of the invention, tuning components such as capacitors are incorporated on the antenna PCB, in order to properly match the antenna to the system impedance. The antenna that is etched onto the PCB is an electrically small resonant loop that looks (without the tuning components) like an inductor in series with a small resistance. The reader used in the preferred embodiment requires the antennas to have an input impedance of 50 ohms. The integrated tuning circuit typically consists of inexpensive capacitors that allows for the entire antenna PCB to be inexpensively mass-produced. The capacitor layout allows for both series and shunt placement of the tuning components if required, and can be configured to perform as a balun to provide a balanced feed to the antenna. Of course, a balun is a transmission line transformer for converting balanced input to unbalanced output or vice versa.

The antenna design of this embodiment allows for economical verification of performance of each antenna, in that the impedance match can be quickly verified by simply sliding the PCB into a card edge connector fixture that is connected to a measurement device (network analyzer). The PCB process is expected to produce a high yield with a small fallout. In addition, the cost of the assembled antenna is so low that the small occurrence of failed units will be acceptable.

Due to the ease with which a PCB antenna can be de-linked from a reader/writer, a non-working antenna is easily replaced with a new antenna. For applications in which the antenna is oriented parallel with the side edge of the shelf, the antenna can be built into a separator unit. Separator units are very common and are used to keep the product in place or upright, such as that of a bookend. Since the antenna is built into an already existing structure, there is no loss of shelf space and the antenna is unrecognizable.

Although FIG. 7 shows PCB antennas being inserted perpendicularly into each slot, the antenna functionality can be further modified so that some or all of the slots accept PCB antennas that are inserted at other angles, such as a 45 degree angle. The reconfigurable functionality of the present invention is sufficiently flexible to handle many combinations and mixtures of products to which RFID tags are attached. A slant of 45 degrees requires a different angle block and board interface to attach. The antenna, which is angled at a 45 degree angle with the shelf surface, will read tags which are attached to the bottom (parallel to the surface of the shelf) and back edge (parallel to the front edge of the shelf) of the product, since the tag cannot be perpendicular to the antenna. The horizontal and vertical format antennas will have read performance problems when the tags are positioned parallel to the surface of the shelf, since this will orient the tag and antenna to be perpendicular to one another.

The present invention also covers other embodiments than those detailed in the figures, as will be understood by a person skilled in the art. For example, a quick release connector may be used to mate a PCB antenna to a tuner board, and thus, in that embodiment, the tuning components (e.g. capacitors) need not be placed on the removable PCB antenna. Also, as mentioned, a ridged wire structure can be used instead of the PCB, and also a hybrid wire/PCB structure can be used.

Although the invention has been shown and described with respect to a best mode embodiment thereof, it should be understood by those skilled in the art that the foregoing and various other changes, omissions and additions in the form and detail thereof may be made therein without departing from the spirit and scope of the invention. It is to be understood that all of the present figures, and the accompanying narrative discussions of best mode embodiments, do not purport to be completely rigorous treatments of the invention under consideration. A person skilled in the art will understand that the various components and structures described herein can be implemented by a variety of different combinations of hardware and software which need not be further detailed herein.

What is claimed is:

1. A system for tracking and locating RFID tags, comprising:
    a reader unit;
    a switch matrix including single pole multiple throw switches;
    a plurality of reconfigurable and replaceable antennae;
    a controller for communicating with the reader and for controlling a state of the switch matrix,
    wherein the reconfigurable and replaceable antennae are located at multiple points that are at least one of within and on at least one shelf;
    wherein the RFID tags are attached to items located on the at least one shelf, and
    wherein the reader unit uses the reconfigurable and replaceable antennae to communicate with the RFID tags; and
    a base joined with the at least one shelf, the base defining a plurality of slots, wherein the antennae are replaceably and reconfigurably plugged into selected slots, wherein other slots remain unoccupied by said antennae.

2. The system of claim 1 wherein a first portion of said plurality of slots is oriented differently from a second portion of said plurality of slots.

3. The system of claim 2 wherein the first portion of said plurality of slots are oriented at right angles relative to said second portion of said plurality of slots.

4. A system for tracking and locating RFID tags, comprising:
    a reader unit;
    a switch matrix including single pole multiple throw switches;
    a plurality of reconfigurable and replaceable antennae;
    a controller for communicating with the reader unit and for controlling a state of the switch matrix; and
    a base joined with the reader unit, the base including a plurality of base attachment devices, wherein the antennae include a plurality of antennae attachment devices that are complimentary to the base attachment devices, wherein the antennae are replaceably and reconfigurably joined via the antennae attachment devices with selected base attachment devices, wherein other base attachment devices remain unjoined with antennae attachment devices.

5. The system of claim 4 wherein the base is joined with a shelf joined with a cabinet, wherein the shelf supports items including the RFID tags, wherein the reader unit communicates with the RFID tags via the reconfigurable and replaceable antennae.

6. A system for tracking and locating RFID tags, comprising:
    a reader unit;
    a switch matrix including single pole multiple throw switches;
    a plurality of reconfigurable and replaceable antennae; and
    a controller for communicating with the reader unit and for controlling a state of the switch matrix,
    wherein the reader unit is joined with a plurality of attachment devices, wherein the antennae are reconfigurably and removably coupled to at least one of the attachment devices, wherein others of the attachment devices remain uncoupled to antennae.

7. A system for tracking and locating RFID tags, comprising:
    a reader unit;
    a switch matrix including single pole multiple throw switches;
    a plurality of reconfigurable and replaceable antennae;
    a controller for communicating with the reader unit and for controlling a state of the switch matrix; and a plurality of antennae attachment devices, wherein the plurality of antennae attachment devices and antennae are oriented relative to a shelf positioned in a cabinet, the shelf supporting items including RFID tags so that the reader unit can read the RFID tags.

8. The system of claim 7 wherein the plurality of antennae are joined with at least one of the plurality of antennae attachment devices, wherein at least one other antenna attachment device remains unjoined with any antennae.

9. The system of claim 8 wherein the antennae attachment devices each define at least one slot, the at least one slot being coupled to the reader unit.

10. The system of claim 8 wherein at least one of the antennae and the plurality of antennae attachment devices include a quick disconnect element, whereby replacement and reconfiguration of the antennae is facilitated.

11. The system of claim 8 wherein at least one antenna is joined with a preselected antennae attachment device so that the at least one antenna is perpendicular to another antenna joined with another preselected antennae attachment device.

12. A system for tracking and locating RFID tags, comprising:

at least one of an RFID reader unit and an RFID writer unit;

a plurality of reconfigurable and replaceable antennae; and a controller for communicating with the at least one of the RFID reader unit and the RFID written unit; and a base coupled to the at least one of the RFID reader unit and the RFID written unit, the base including a plurality of base attachment devices, wherein the antennae include a plurality of antennae attachment devices that are complimentary to the base attachment devices, wherein the antennae are replaceably and reconfigurably joined via the antennae attachment devices with selected base attachment devices, wherein other base attachment devices remain unjoined with antennae attachment devices, wherein the at least one of the RFID reader unit and the RFID written unit uses the reconfigurable and replaceable antennae to communicate with the RFID tags.

* * * * *